(12) United States Patent
Baset et al.

(10) Patent No.: US 10,754,989 B2
(45) Date of Patent: Aug. 25, 2020

(54) RUNTIME SELF-CORRECTION FOR BLOCKCHAIN LEDGERS

(71) Applicant: International Business Machines Corporation, Armonk, NY (US)

(72) Inventors: Salman Abdul Baset, New York, NY (US); Donna N. Dillenberger, Yorktown Heights, NY (US); Petr Novotny, Mount Kisco, NY (US); Qi Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 15/937,375

(22) Filed: Mar. 27, 2018

(65) Prior Publication Data

US 2019/0303621 A1  Oct. 3, 2019

(51) Int. Cl.
| | |
|---|---|
| H04L 29/06 | (2006.01) |
| G06F 21/64 | (2013.01) |
| H04L 9/06 | (2006.01) |
| G06F 11/08 | (2006.01) |
| G06Q 20/22 | (2012.01) |
| G06F 11/14 | (2006.01) |

(Continued)

(52) U.S. Cl.
CPC ............ *G06F 21/64* (2013.01); *G06F 11/08* (2013.01); *G06F 11/1402* (2013.01); *G06F 11/1482* (2013.01); *G06Q 20/223* (2013.01); *G06Q 20/3827* (2013.01); *H04L 9/0637* (2013.01); *H04L 63/123* (2013.01); *H04L 67/104* (2013.01)

(58) Field of Classification Search
CPC ....... H04L 9/0637; H04L 9/0643; H04L 9/32; H04L 9/3247; H04L 9/3213; H04L 63/123; H04L 67/104; H04L 63/0428; G06F 21/64; G06F 11/08; G06F 11/1402; G06F 11/1482; G06Q 20/223; G06Q 20/3827; G06Q 20/38215; G06Q 20/3825; G06Q 20/389; G06Q 20/40; G06Q 20/401; G06Q 20/4016; G06Q 20/407

See application file for complete search history.

(56) References Cited

U.S. PATENT DOCUMENTS

| | | |
|---|---|---|
| 3,668,631 A | 6/1972 | Griffith et al. |
| 5,233,618 A | 8/1993 | Glider et al. |

(Continued)

OTHER PUBLICATIONS

Androulaki et al.; "Hyperledger Fabric: A Distributed Operating System for Permissioned Blockchains"; IBM; ISBN 978-1-4503-5584—Jan. 18, 2004; 2018.

(Continued)

*Primary Examiner* — Malcolm Cribbs

(57) ABSTRACT

An example operation may include one or more of identifying, via a ledger validation thread, a corrupted data block that is stored within a chain of blocks on a distributed ledger, selecting a blockchain peer from among a plurality of blockchain peers that have access to the distributed ledger, and retrieving a replacement data block from the selected peer, determining whether the replacement data block is valid based on one or more of a previously stored validation block associated with the chain of blocks, and, in response to determining the replacement data block is valid, replacing the corrupted data block with the replacement data block on the distributed ledger.

20 Claims, 10 Drawing Sheets

(51) Int. Cl.
*G06Q 20/38* (2012.01)
*H04L 29/08* (2006.01)

(56) References Cited

U.S. PATENT DOCUMENTS

| | | | |
|---|---|---|---|
| 5,844,919 A | 12/1998 | Glover et al. | |
| 5,848,076 A | 12/1998 | Yoshimura | |
| 7,296,213 B2 | 11/2007 | Vainsencher et al. | |
| 10,133,503 B1* | 11/2018 | Colgrove | G06F 3/0689 |
| 2010/0323637 A1* | 12/2010 | Roman | H04B 7/0689 |
| | | | 455/101 |
| 2011/0078459 A1* | 3/2011 | Yoshioka | H04N 5/77 |
| | | | 713/189 |
| 2013/0067270 A1* | 3/2013 | Lee | G06F 11/1004 |
| | | | 714/6.1 |
| 2013/0246688 A1* | 9/2013 | Kanno | G06F 12/0246 |
| | | | 711/103 |
| 2014/0149827 A1* | 5/2014 | Kim | G06F 11/1064 |
| | | | 714/766 |
| 2014/0181575 A1* | 6/2014 | Kalach | G06F 11/1415 |
| | | | 714/6.11 |
| 2017/0228371 A1 | 8/2017 | Seger | |
| 2017/0295023 A1* | 10/2017 | Madhavan | G06Q 20/0655 |
| 2018/0052681 A1* | 2/2018 | Pereira Cabral | G06F 9/445 |
| 2018/0082296 A1 | 3/2018 | Brashers | |
| 2018/0159682 A1* | 6/2018 | Futcher | H04L 9/3236 |
| 2019/0004888 A1* | 1/2019 | Chagam Reddy | G06F 11/0709 |
| 2019/0019180 A1* | 1/2019 | Coburn | H04L 9/3247 |
| 2019/0236298 A1* | 8/2019 | Agarwal | H04L 9/3247 |

OTHER PUBLICATIONS

International Search and Written Opinion issued in the corresponding international application No. PCT/ EP2019/055894, dated May 22, 2019.
Raman et al., "Distributed Storage Meets Secret Sharing on the Blockchain", 2018 Information Theory and Applications Workshop (ITA), Feb. 1 2019, pp. 1-6.

* cited by examiner

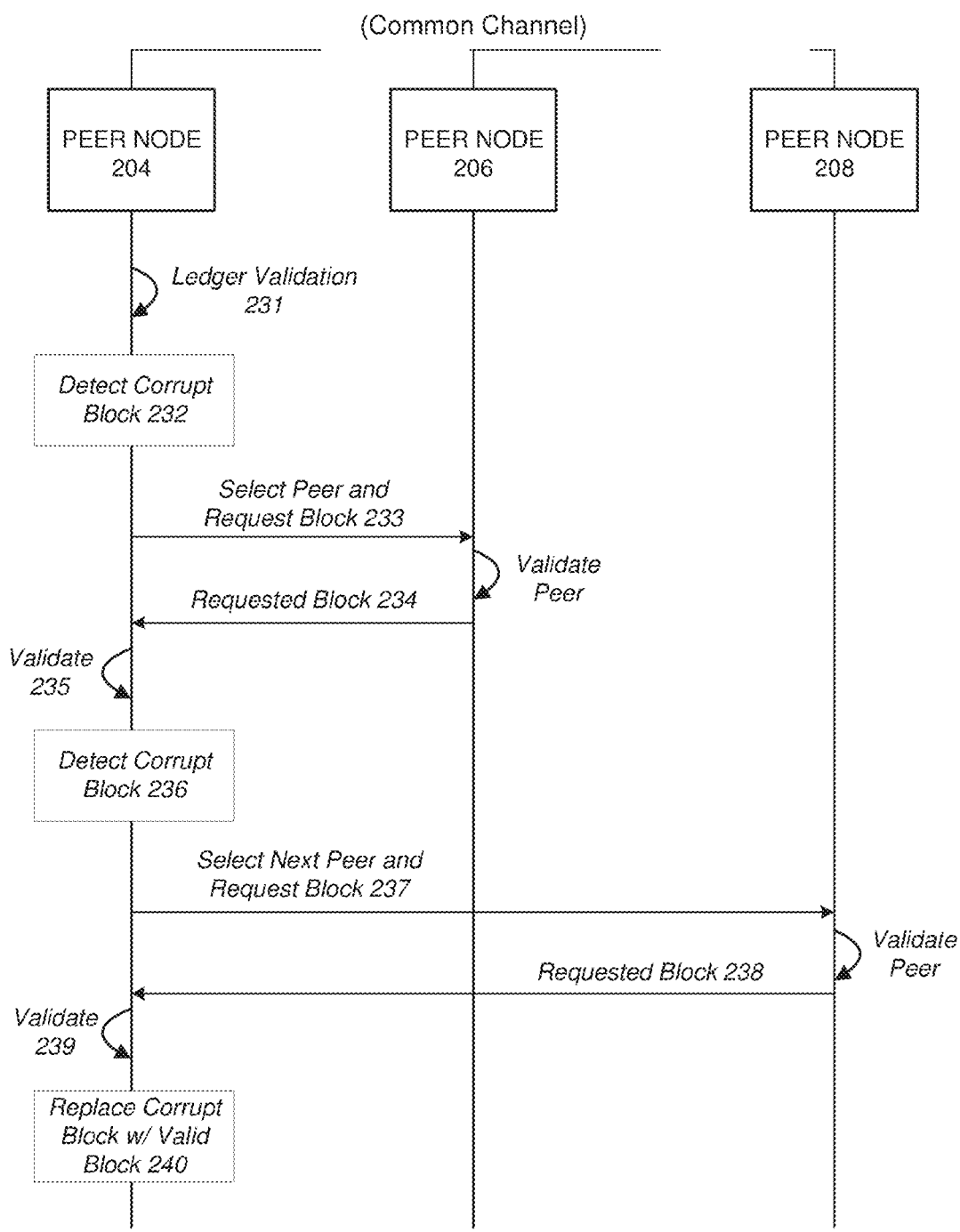

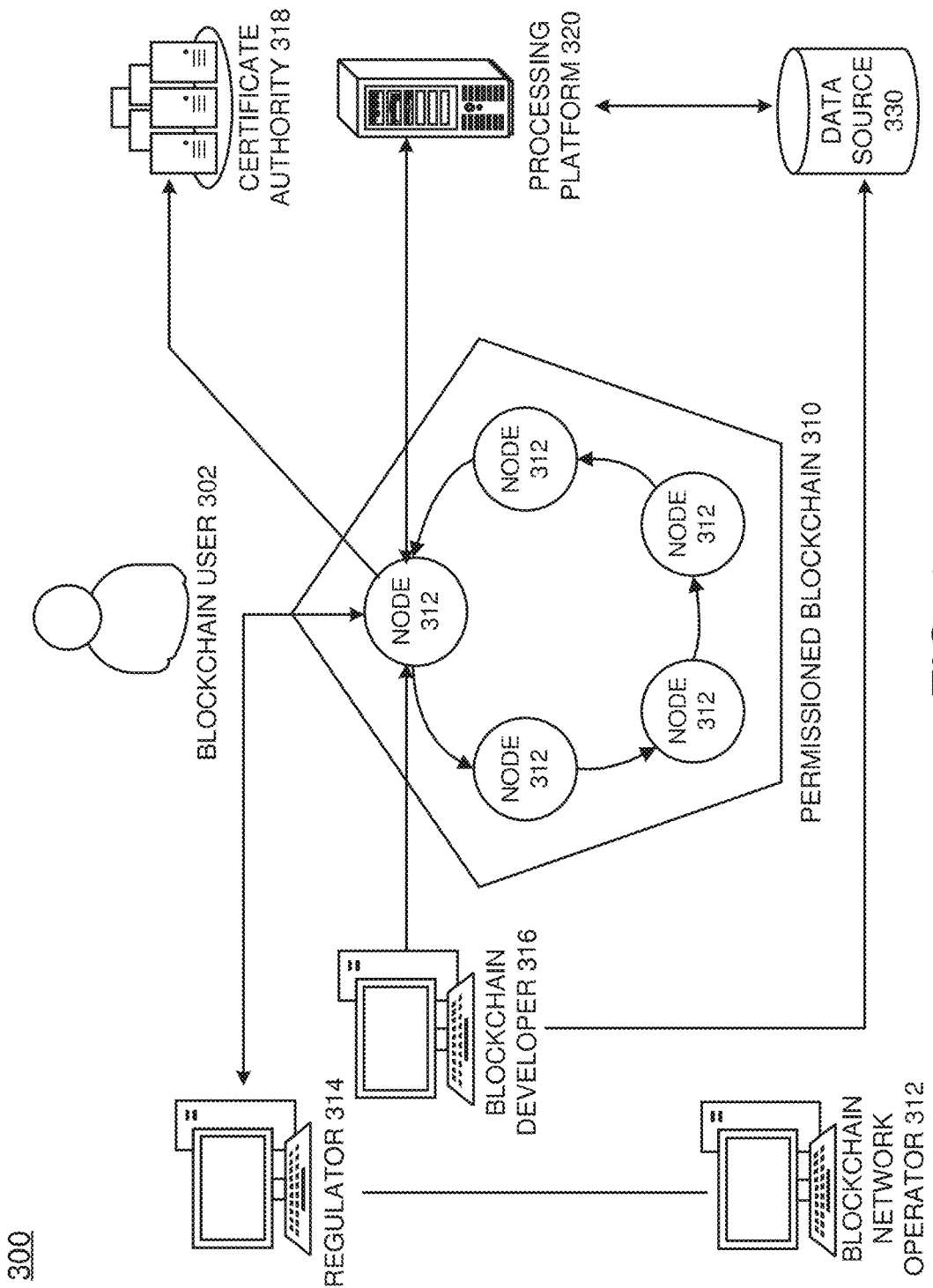

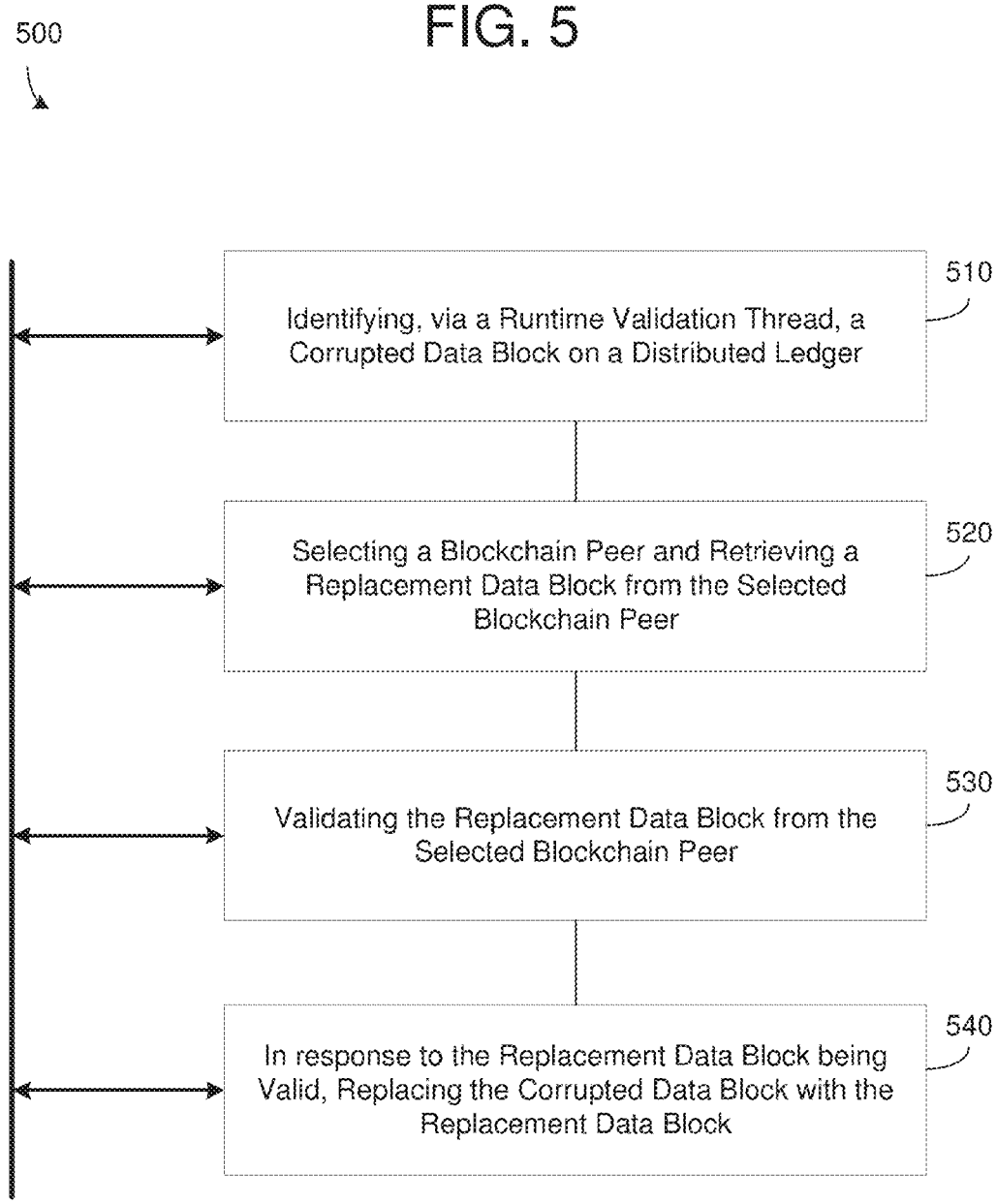

RUNTIME SELF-CORRECTION FOR BLOCKCHAIN LEDGERS

TECHNICAL FIELD

This application generally relates to error detection, and more particularly, to a computing node that auto-detects a corrupted data block on a distributed ledger (such as a blockchain) at runtime, and self-corrects the corrupted data block based on data stored at another computing node sharing the same distributed ledger.

BACKGROUND

A ledger is commonly defined as an account book of entry in which transactions are recorded. Meanwhile, a distributed ledger is digital ledger that is replicated in whole, or in part, across multiple computing nodes. The distributed ledger may be secured through cryptographic properties, also referred to as a cryptographic distributed ledger (CDL). A CDL can have at least some of the following characteristics, irreversibility (e.g., once a transaction is recorded it cannot be reversed), accessibility (e.g., any party can access the CDL in whole or in part), chronological and time-stamped (e.g., all participating parties know when a transaction was added to the ledger and in what order it was added), consensus-based (a transaction is added only if it is approved, typically unanimously, by parties on the network), verifiability (all transactions can be cryptographically verified), and/or the like. One non-limiting example of a cryptographic distributed ledger is a blockchain.

A distributed ledger, such as a blockchain, typically stores a continuously growing list of records. Although, often used for financial transactions, a blockchain can store other data such as information related to goods and services (i.e., products, packages, status, etc.), digital currency, stock, equity, software models, proprietary data, and other information. A decentralized scheme provides authority and trust to a decentralized network and enables its nodes to continuously and sequentially record their transactions on a public or a private "block", creating a unique "chain" referred to as a blockchain. Cryptography, via hash codes, is used to secure an authentication of a transaction source and removes a central intermediary. The distributed ledger is secured from tampering and revision due to its immutable properties. For example, each block may contain a timestamp and a link to a previous block. Blockchain can be used to hold, track, transfer and verify information. Blockchain peers within the blockchain network may trigger a transaction to the blockchain ledger through an endorsement and consensus protocol with one or more other blockchain nodes ensuring that one entity cannot change the blockchain ledger on their own.

Conventionally, blockchain peer nodes only append new data blocks to a blockchain ledger. That is, blockchain nodes typically add new data blocks only rather than modifying or otherwise tampering with previously stored and existing data blocks. One of the reasons for this is because of the immutable properties of the distributed ledger and the endorsement and consensus processes required before new data to be added to the distributed ledger. However, data blocks within a blockchain ledger may become corrupt over time for various reasons such as malicious attack, system failure, software errors, and the like. As such, what is needed is a mechanism for repairing unwanted blocks in a blockchain ledger.

SUMMARY

One example embodiment may provide a method that includes at least one of identifying, via a ledger validation thread, a corrupted data block that is stored within a chain of blocks on a distributed ledger, selecting a blockchain peer from among a plurality of blockchain peers that have access to the distributed ledger, and retrieving a replacement data block from the selected peer, determining whether the replacement data block is valid based on one or more of a previously stored validation block associated with the chain of blocks, and in response to determining the replacement data block is valid, replacing the corrupted data block with the replacement data block on the distributed ledger.

Another example embodiment may provide a system that includes at least one of a memory storing a distributed ledger, and a processor configured to identify, via a ledger validation thread, a corrupted data block that is stored within a chain of blocks on the distributed ledger, select a blockchain peer from among a plurality of blockchain peers that have access to the distributed ledger, retrieve a replacement data block from the selected peer, determine whether the replacement data block is valid based on one or more of a previously stored validation block associated with the chain of blocks, and in response to determining the replacement data block is valid, replace the corrupted data block with the replacement data block on the distributed ledger.

A further example embodiment may provide a non-transitory computer readable medium comprising instructions, that when read by a processor, cause the processor to perform at least one of identifying, via a ledger validation thread, a corrupted data block that is stored within a chain of blocks on a distributed ledger, selecting a blockchain peer from among a plurality of blockchain peers that have access to the distributed ledger, and retrieving a replacement data block from the selected peer, determining whether the replacement data block is valid based on one or more of a previously stored validation block associated with the chain of blocks, and in response to determining the replacement data block is valid, replacing the corrupted data block with the replacement data block on the distributed ledger.

BRIEF DESCRIPTION OF THE DRAWINGS

FIG. 2B is a diagram illustrating a transactional flow between blockchain nodes for self-correcting a corrupted block, according to example embodiments.

FIG. 3 is a diagram illustrating a permissioned blockchain network, according to example embodiments.

FIG. 5 is a flow diagram illustrating a method for self-correcting a corrupted data block of a distributed ledger, according to example embodiments.

DETAILED DESCRIPTION

Figure 1A:
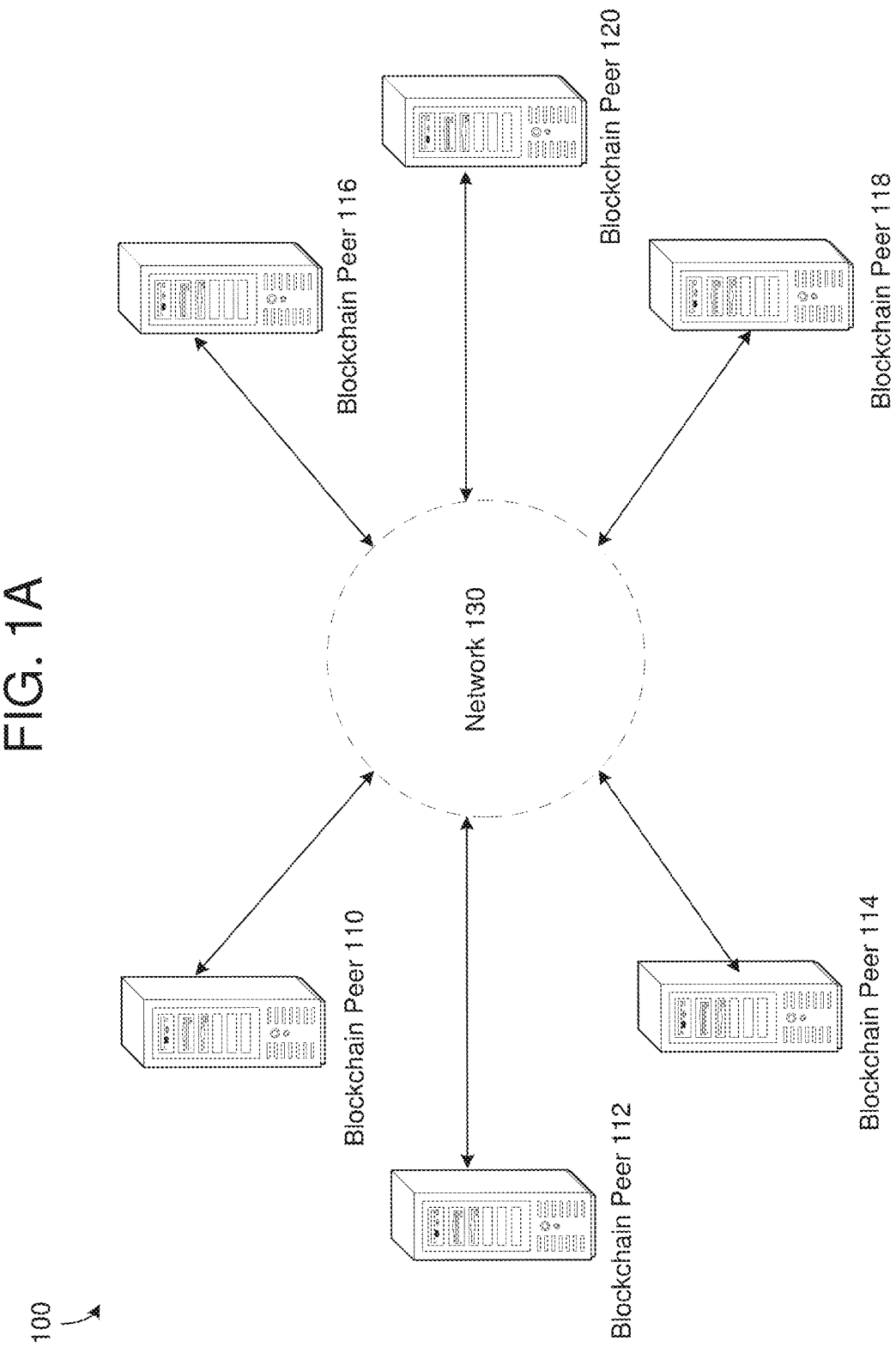
FIG. 1A is a diagram illustrating a blockchain network including a plurality of blockchain peers, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Conventionally, a blockchain peer only modifies a distributed ledger by appending or otherwise committing a new data block to an existing chain of blocks when a plurality of nodes implementing the distributed ledger reach a consensus on the new block. However, the blockchain peer is not capable of validating previously stored blocks of the distributed ledger. In other words, the blockchain peer cannot ensure that the distributed ledger is accurate. As a result, corrupted data blocks may exist within a local copy of a distributed ledger causing problems within the entire blockchain network.

The example embodiments provide methods, devices, networks and/or systems, which provide a solution to these problems by implementing a ledger validation thread that can validate previously stored blocks on a distributed ledger. The ledger validation thread may detect when a data block has become corrupted using various different validation methods. In response to identifying a corrupted data block, the ledger validation thread may retrieve a replacement data block from another blockchain peer on the same channel, validate the replacement data block, and replace the corrupted data block with the validated replacement data block. Accordingly, the ledger validation thread may self-repair (i.e., self-correct) a distributed ledger when one or more blocks on the ledger have become corrupted due to malicious activity, software error, hardware failure, or the like. Various triggers may initiate the runtime validation process such as a periodic interval of time, a change to the ledger, a request from an admin, and the like. While the description and figures herein are described in terms of a blockchain, the instant application applies equally to any type of distributed ledger.

The ledger (also referred to as a digital ledger, distributed ledger, immutable ledger, etc.) is a key component in blockchain systems because it contains a record of all transactions executed and committed by the blockchain network. The ledger also has as other metadata, such as signatures of the transactions and hash values of data blocks. Therefore, the faultlessness and integrity of the ledger are critical to the correct and effective functioning of the blockchain. In a typical blockchain network, each blockchain peer node maintains a full copy of the ledger and stores it as a series of files on a storage medium, which is vulnerable to corruptions. The corruption can happen due to many reasons, for example, a malicious user may hack into the peer node and intentionally modify the files that store the ledger, a hardware fault may occur, a software bug may corrupt the ledger files, and the like.

In many blockchain systems such as Hyperledger Fabric, a peer node works in a way that it only appends new blocks to the end of the ledger and does not regularly validate the existing blocks in the ledger. As a result, corrupted blocks in the ledger cannot be detected in time, which can be detrimental to the blockchain systems for many reasons. For example, at the peer start time, the peer could fail to boot up due to the corrupted ledger. As another example, during the peer runtime, when a blockchain analytics workload is running in a peer node and needs to access a transaction in a corrupted block, the transaction cannot be successfully accessed. Thus, the analytics workload could fail due to the existence of this corrupted block.

In order to reduce the impact of corrupted blocks on the functionality of a blockchain system, the example embodiments are directed to a runtime self-correction mechanism for a digital ledger such as a blockchain ledger. According to various aspects, a separate thread (i.e. a ledger validation thread) is periodically running on a peer node and validates the blocks in the ledgers of this peer. If a corrupted block is detected, the ledger validation thread may select another peer (i.e. peer P2), which may have a correct version of the corrupted block, and requests a replacement block from the other peer. Upon receiving the request, P2 may validate the requesting peer, and send the corresponding block if the requesting peer is legal. Then, after receiving the replacement block, P1 validates the block and replaces the corrupted one if the received block is valid. Otherwise, P1 may ask a different peer (i.e., P3) for the same block when the block received from P2 is not valid. The system is provided in such a way that users (e.g., administrators, etc.) may configure the ledger validation thread in many ways, such as how frequent the thread runs and which part of the ledger needs to be validated.

Unlike the ledger, which is a set of files on a storage medium, the ledger validation thread is a program running in a memory of a blockchain peer or otherwise connected to the blockchain peer. The compiled code of the program may be stored separately from the ledger. The specifics may depend on implementation. For example, if the ledger validation thread is implemented as a part of a peer, the ledger validation thread program may be protected in the same as the program of the Peer (i.e. stored in an isolated location in a secure container). As another example, if the ledger validation thread is implemented as an independent program, the ledger validation thread may have independent security configuration from the program of the Peer thereby allowing an admin to configure higher security settings. In either case, the ledger validation thread program may be completely separated from the ledger and the cause of the corruption or bad actor will not have access to the program. Also, the ledger validation thread may be completely hidden to users transacting on the blockchain. That is, the blockchain users cannot interact with the thread, however, the blockchain admins can to configure the mechanism, and start and stop it.

If the ledger validation thread is implemented as a part of the peer, the ledger validation thread program may be installed (added) as part of the peer code and start and stop along with the peer. As another example, if the ledger validation thread is implemented as an independent program, the admin may use the thread as an independent software to connect to the ledger and run the algorithms on demand. Also, if the ledger validation thread is implemented as a part of the peer, the validation may be a background process/thread and can be triggered by various possible ways including but not limited to, (1) the thread validates the ledger in a periodical manner, so it is triggered at a specific period of time after it finished the previous scan, (2) the thread may be triggered when the resources (i.e. CPU, memory, etc.) utilization of the peer node is lower than a threshold, (3) the thread may be triggered explicitly by the admin. If the ledger validation thread is implemented as an independent program, the admin may run the ledger validation thread on demand.

FIG. 1A illustrates a blockchain network 100 including a plurality of blockchain peers, according to example embodiments. Referring to the example of FIG. 1A, the network 100 includes blockchain nodes 110, 112, 114, 116, and 118, and 120 which are connected via a network 130 such as the Internet, a private network, and/or the like. In this example, any of the nodes (110-120) may serve one or more roles such as a peer, an endorser, an orderer, etc. According to various aspects, any of the nodes 110-120 may have a ledger validation thread installed and running therein for verifying/validating data blocks of a distributed ledger stored by the respective node.

For example, blockchain node 110 may have the ledger validation thread executing therein to verify a copy of the distributed ledger stored by the blockchain node 110. When the ledger validation thread determines that a corrupt block exists, the ledger validation thread may cause blockchain node 110 to send a request for a replacement block to any of the other nodes 112, 114, 116, 118, and 120. In response, a replacement block can be retrieved and the blockchain node 110 may verify the replacement block. When successfully verified, the blockchain node 110 may replace the corrupted block with the replacement block. If, however, the verification is not successful, the blockchain node 110 can request a replacement block from another node.

Figure 1B:
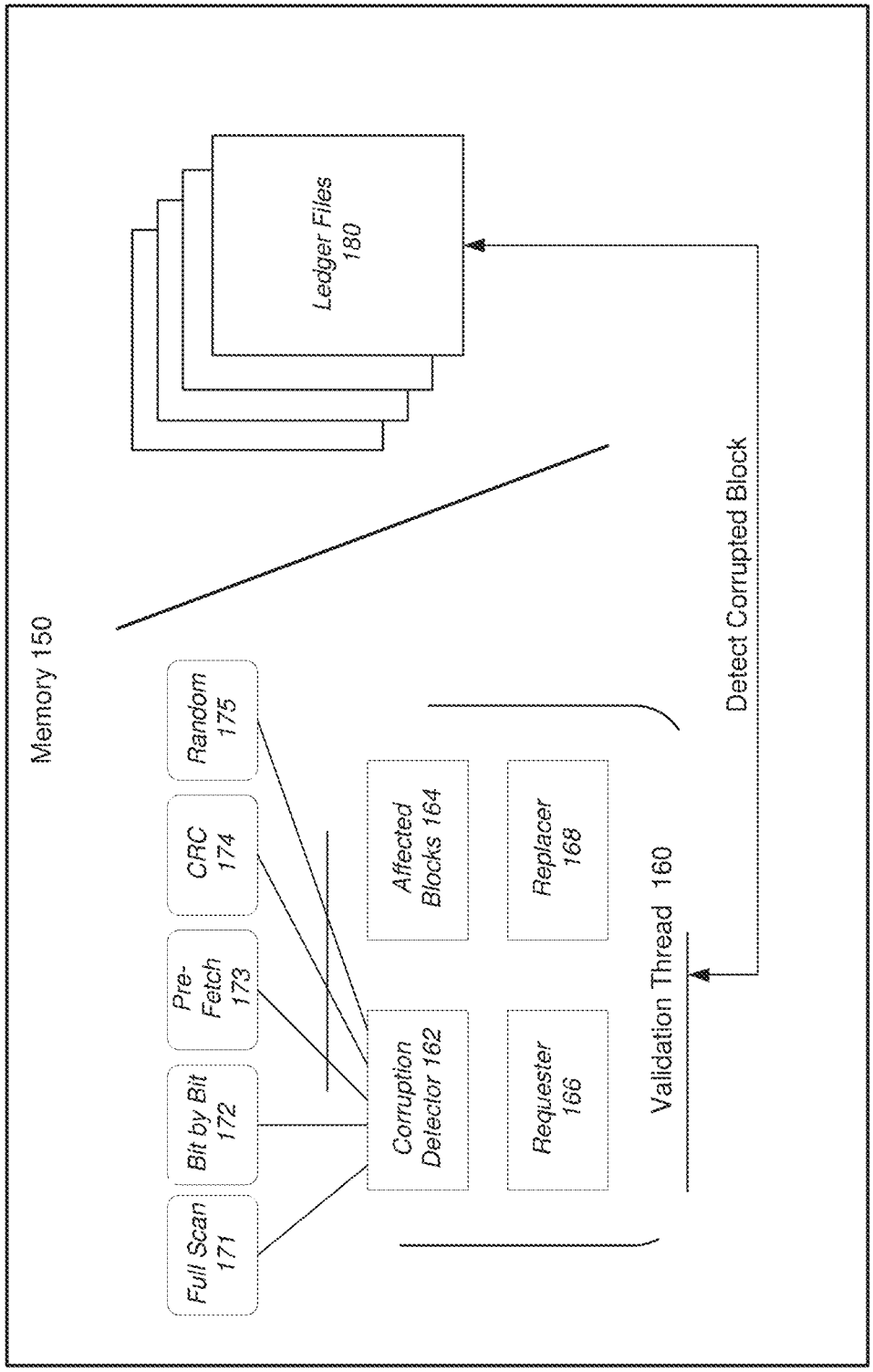
FIG. 1B is a diagram illustrating a ledger validation thread interacting with a distributed ledger, according to example embodiments.

FIG. 1B illustrates a ledger validation thread 160 interacting with a distributed ledger 180, according to example embodiments. In this example, both the ledger validation thread 160 (i.e., program and compiled code) and the files of the distributed ledger 180 are stored in memory 150 such that the ledger validation thread 160 and the distributed ledger 180 are isolated from one another. According to various embodiments, the ledger validation thread 160 may include a program running on the blockchain peer node checking the integrity of the distributed ledger 180 on this peer. The ledger validation thread 160 may include a corruption detector module 162 for detecting one or more data blocks on the ledger that have been corrupted, an affected blocks module 164 for detecting which blocks on the ledger are affected, a requester module 166 for retrieving correct blocks for the corrupted blocks from one or more adjacent peer nodes, and a replacer module 168 for replacing at least the corrupted data block with the replacement data block (and possibly replacing other trailing data blocks).

The corrupted block detection module 162 may implement various corruption detection processes. A peer can contain many ledgers and each ledger is logically organized in a linked list. Each item in the linked list represents a block and different blocks in the same ledger are connected by hash pointers. Each block includes a header section and a data section. The block header contains a hash value of the previous block. Basically, a block B is considered as valid if the following condition is satisfied: hash (B)==nextBlock.Header.prevBlockHash. Otherwise, the block B is considered as a corrupted block.

According to various embodiments, one or more methods from among multiple approaches can be used to detect a broken block in the ledger. For example, the corruption detection may include sequentially scanning the ledger and validating each block by comparing the hash values, in 171, which can be CPU intensive. As another example, the corruption detection may include performing a bit-by-bit comparison of the ledger with its backup, in 172, which has been previously stored in memory 150. This approach may compare the ledger with its backup in a streaming manner, which is faster than calculating the hash value. But a ledger back up may not always be available and can be vulnerable to attacks.

As another example, in 173, the corruption detection may pre-fetch data block based on an access pattern from analytics workloads based on a currently requested block, etc. In this example, some blocks may be pre-fetched and validated. The pre-fetch operation may be based on a heuristic which informs about a relationship between blocks. Based on this heuristic, when a block is accessed, the related blocks are pre-fetched and validated. For example, the heuristic can be based on the locality principle of the block accesses, observing that when a block is accessed, the probability of the nearby blocks being accessed in the near future is high.

As another example, in 174, the corruption detector may implement a checksum algorithm (e.g., cyclic redundancy check (CRC), etc.) to validate the blocks. This approach may create a checksum for each block and use this checksum to validate the blocks. A fast checksum generation algorithm, such as CRC, is faster than calculating the hash of a block. But the checksum data can also be vulnerable to attacks. The CRC may work somewhat differently than the hash based approach. In this case, the CRC algorithm may be used to create parallel list of block sums. These sums are checked instead of hashes. The advantage of doing so is the higher speed of this approach. Since the data are held in memory of the checking algorithm and process these are not vulnerable to the attacks that the ledger is vulnerable to.

As another example, in 175, the corruption detection may randomly choose some blocks to validate but not all. This approach consumes less CPU than validating the whole ledger, but it is a probabilistic approach that cannot guarantee the correctness of every block in the ledger.

When receiving a replacement block, the peer may determine the validity of the block in different ways including using a hash of the block stored in the following block which may be the default blockchain action. As another example, the peer may use a hash of a block stored in memory of the Peer. In this example, the peer may obtain this hash when it was traversing and validating the peer at its startup time.

It should also be appreciated that a peer may be selected in different ways. For example, when a block is detected as a corrupted block, the peer (i.e. peer1) needs to contact another peer to get a correct block. In order to achieve better performance of the ledger correction process, the peer may choose another peer with a better network connection. Peers can span in different locations and the network quality among different peers varies from time to time. A better network connection accelerates the block transmission, thus may improve the performance of the ledger correction process. As an example, a quality of the network connection can be measured by the latency of a 'ping'. As another example, the peer may choose another peer that is less busy. The workloads running on different peers are not the same. For example, in Hyperledger Fabric, some peer nodes only commit the blocks while some others peer nodes also need to simulate transactions. Therefore, it may be better to choose a peer node that is running less intensive workloads, so that that peer can respond more quickly to the requests, which also improves the performance of the ledger correction process.

As described herein, a blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts trans-action-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

As described herein, a ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and crypto-graphically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Figure 2A:
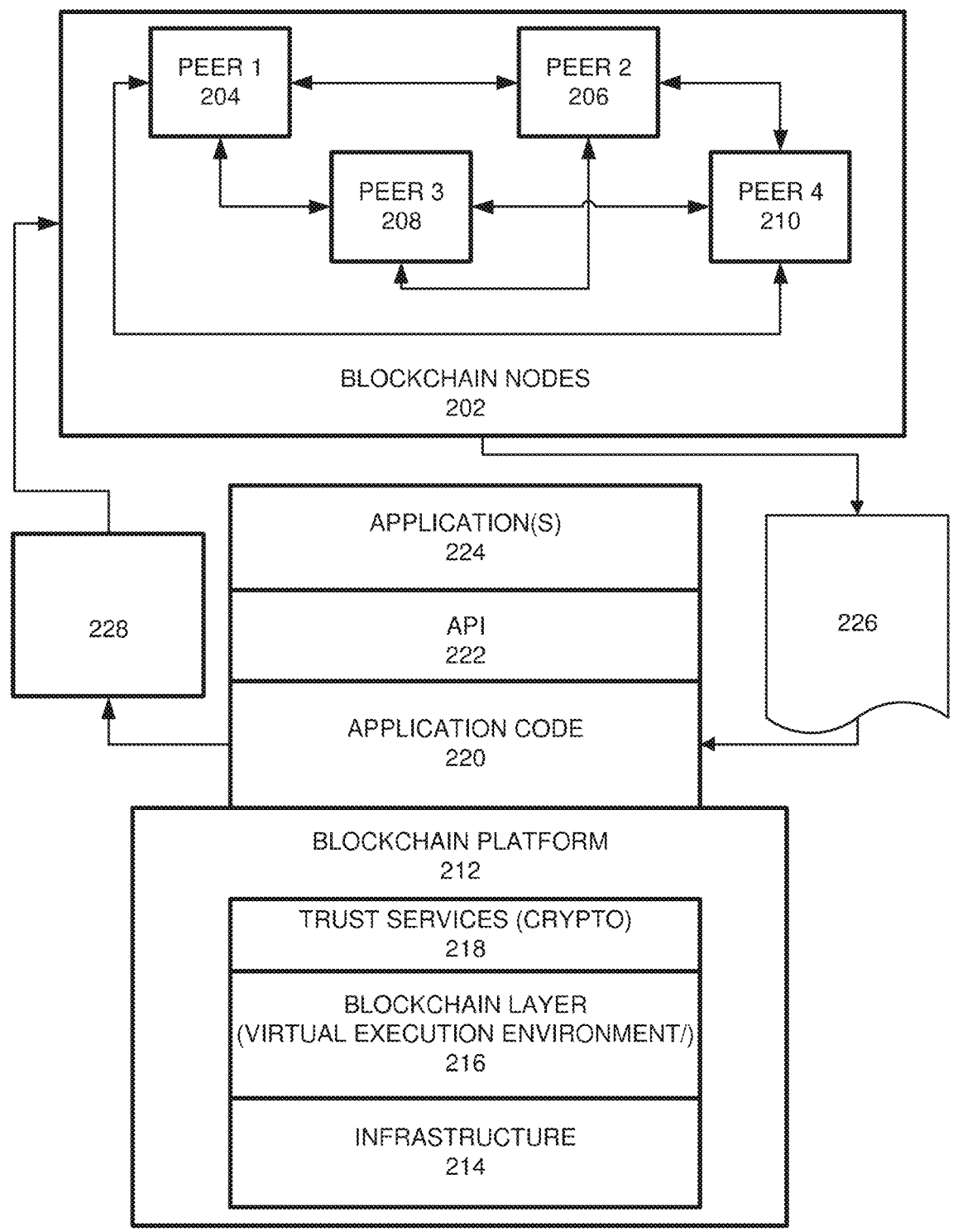
FIG. 2A is a diagram illustrating a peer node blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information 226 may be processed by one or more processing entities (e.g., virtual machines) included in the blockchain layer 216. The result 228 may include blocks of data added to the ledger. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 2B illustrates a transactional flow 250 between blockchain nodes for self-correcting a corrupted block, according to example embodiments. In this example, a blockchain node 204 auto-detects and self-repairs a corrupted data block on a distributed ledger that is managed by the blockchain node 204. Here, the corrupted ledger may be the local copy that is stored by the blockchain node 204. In 231, a ledger validation thread running on the blockchain node 204 performs a ledger validation process using one or more of the methods described above in 171-175 of FIG. 1B. In 232, the ledger validation thread on the blockchain node 204 detects a corrupted block. In 233, the blockchain node 204 identifies and selects a blockchain node 206 from which to receive a replacement block and transmits a request for the replacement block which may include an ID of the corrupted block and may also include an ID of one or more trailing blocks. When the request arrives at the blockchain node 206, it may not be handled by a ledger validation thread of the blockchain node 206 but instead may be handled by a built-in routine/function that exists in Hyperledger Fabric and that listens to such requests and returns the blocks accordingly.

In 234, the selected blockchain node 206 validates the blockchain node 204 from which the request is received using one or more encryption keys, block data, etc. and transmits a replacement block to the blockchain node 204. Here, the blockchain node 204 validates the corrupted block in 235 and the blockchain node 204 can replace the corrupted block with the replacement block received from blockchain node 206 if the block is valid. However, in this example, in 236, the ledger validation thread of blockchain node 204 determines that the replacement block is not valid. Therefore, in 236, the ledger validation thread selects a next blockchain node 208, and in 237 causes the blockchain node 204 to send a request for a replacement block to the next blockchain node 208. In 238, the blockchain node 208 validates the blockchain node 204, and transmits a copy of a replacement block requested by the blockchain node 204. In 239, the ledger validation thread executing on blockchain node 204 confirms the validity of the replacement block and replaces the corrupted block in 240.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 312 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
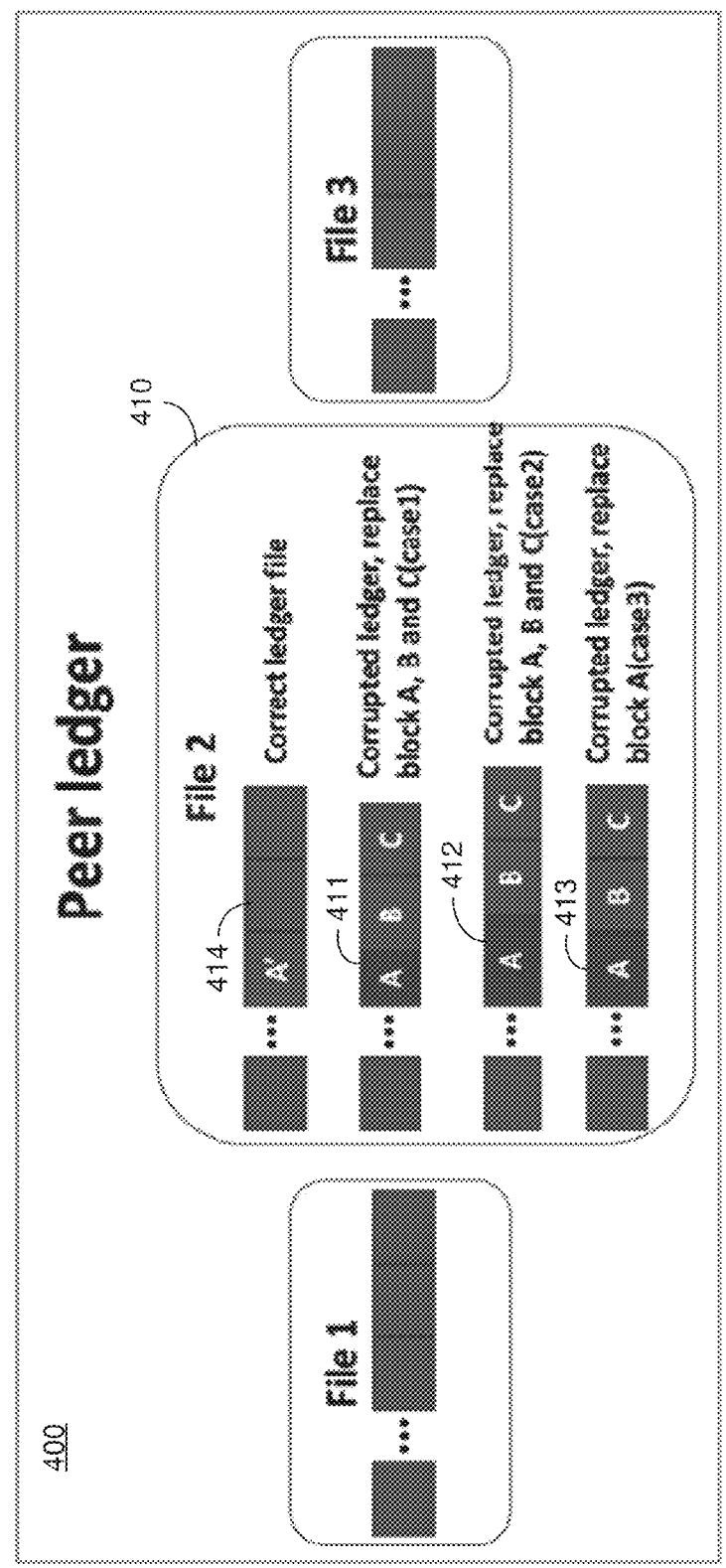
FIG. 4 is a diagram illustrating multiple examples of a ledger correction process, according to example embodiments.

FIG. 4 illustrates multiple examples of a ledger correction process, according to example embodiments. In this example, a blockchain ledger 400 is made up of a plurality of files including three files (i.e., files 1, 2, and 3). In this example, the ledger validation thread detects a corrupted data block (block A) that is stored in the second file (file 410). In blockchain systems such as Hyperledger Fabric, the ledger is physically organized as multiple fixed-size files, and the blocks are stored in a continuous manner in these files. As shown in the example of FIG. 4, block A in the second file 410 is detected as a broken block. Meanwhile, block A' is a correct block that has been retrieved from another peer and validated. If the size of block A is not equal to that of block A', simply replacing block A with block A' could either overwrite block B or leave a gap between block A and block B (and cause problems in any other trailing blocks in addition to block B). Therefore, the ledger correction process may first determine/check whether a size of the second file 410 has changed.

As shown in the example of FIG. 4, the ledger correction process performed by the ledger validation thread can replace all the blocks in the second file 410 that are subsequent to block A. For example, in process 411 the ledger correction process replaces blocks A, B, and C because the size of the data block A is smaller than it should be. Meanwhile, in the example of process 412 the ledger correction process replaces blocks A, B, and C because a size of the data block A is larger than it should be. Otherwise, only block A may be overwritten when the size of the data block A does not change (and does not change the overall file size).

As will be understood, blocks are stored in files in the file system. Typically, one file contains a continuous series of blocks. Therefore, if a malicious user opens the file that contains block A and adds some random bytes in that file into the location where block A is, block A will become bigger as in the case of process 412. Similarly, if the malicious user delete some bytes in that file, block A will become smaller as is the case in process 411. When replacing a data block A with data block A', block A and block A' need to start at the same offset of the file, however, the size of block A' is bigger than that of block A, and block A and block B are adjacent in the original ledger file. Thus, if only block A is replaced with block A', part of block B will be overwritten by block A', which is not acceptable.

As another example, if block A is corrupted and becomes bigger, only replacing block A with block A' will leave a file hole between block A' and block B, which also breaks the integrity of the ledger. Moreover, when block A is corrupted and becomes bigger or smaller, this offsets all its subsequent blocks in the file. Therefore, in this case, although only block A is corrupted, all its subsequent blocks in that specific file (i.e. block B and block C in this example) should be replaced to guarantee the integrity of the whole ledger. Thus, even though block B and C were not corrupted, in order to correct the whole file, the blocks need to be all rewritten in the correct sequence to guarantee continuity of the file.

Meanwhile, in the third case of process 413, block A is corrupted but its size does not change. In other words, the size of block A' is equal to the size of block A, and the offsets of all its subsequent blocks in this file stay the same. Therefore, simply replacing block A with block A' will fix the corrupted block A. At the same time, block B will not be overwritten, nor there is a file hole between block A' and block B.

FIG. 5 illustrates a method 500 for self-correcting a corrupted data block of a distributed ledger, according to example embodiments. For example, the method 500 may be performed by a computing node such as a blockchain peer node which may be implemented through a cloud platform, a server, a desktop computer, a user device, and the like. Referring to FIG. 5, in 510, the method may include identifying, via a ledger validation thread, a corrupted data block that is stored within a chain of blocks on a distributed ledger. For example, the ledger validation thread may include a program running in memory having compiled code which is stored separately from files that make up the distributed ledger. The distributed ledger files may be isolated from or otherwise hidden from users/nodes interacting with the distributed ledger.

According to various aspects, the corrupt data block or blocks may be detected through any of various methods. For example, the identifying the corrupted data block, via the ledger validation thread, may include sequentially scanning data blocks of the distributed ledger and validating the sequentially scanned data blocks based on respective hash values of the sequentially scanned data blocks generated at runtime to identify the corrupted data block. As another example, the identifying of the corrupted data block, via the ledger validation thread, may include performing a bit-by-bit comparison of the distributed ledger with a backup copy of the distributed ledger to identify the corrupted data block based on the bit-by-bit comparison. As another example, the identifying of the corrupted data block, via the ledger validation thread, may include pre-fetching data blocks from the distributed ledger based on a block access pattern associated with a data block currently selected from the distributed ledger, and validating the pre-fetched data blocks based on respective hashes of the pre-fetched data blocks to identify the corrupted data block from the pre-fetched data blocks. As another example, the identifying the corrupted data block, via the ledger validation thread, may include sequentially validating data blocks of the distributed ledger based on previously generated checksum values of the respective data blocks to identify the corrupted data block based on the checksum values. As another example, the identifying the corrupted data block, via the ledger validation thread, may include randomly selecting data blocks from the distributed ledger and validating the randomly selected data blocks based on respective hashes of the randomly selected data blocks to identify the corrupted data block from the randomly selected data blocks.

In 520, the method may include selecting a blockchain peer from among a plurality of blockchain peers that have access to the distributed ledger, and retrieving a replacement data block from the selected peer. The peer may be selected randomly or it may be selected based on one or more attributes such as current throughput, location, current workload, type of blockchain peer (e.g., endorsing node, organizing node, peer node, etc.), and the like. In 530, the method may include determining whether the replacement data block is valid based on one or more of a previously stored validation block associated with the chain of blocks, and in response to determining the replacement data block is valid, in 540 the method may include replacing the corrupted data block with the replacement data block on the distributed ledger. In some embodiments, the previously stored validation block may be a block that has been previously stored in a backup copy of the ledger of a blockchain node executing the ledger validation thread. As another example, the replacement data block may be validated based on a hash value of the block which is obtained from a following data block within the chain of blocks.

In some embodiments, the corrupted block may change a size of the original block thus creating a change to a size of the ledger. Therefore, simply replacing the corrupted block could leave a hole in the ledger (i.e., when the corrupted block is smaller in size) or overwrite part of an adjacent block (i.e., when the corrupted block is larger in size). Therefore, in some embodiments the method may further include retrieving a replacement data block for one or more following data blocks in the chain of blocks on the distributed ledger when it is determined that the corrupted data block has changed a block size of its original data block.

Figure 6A:
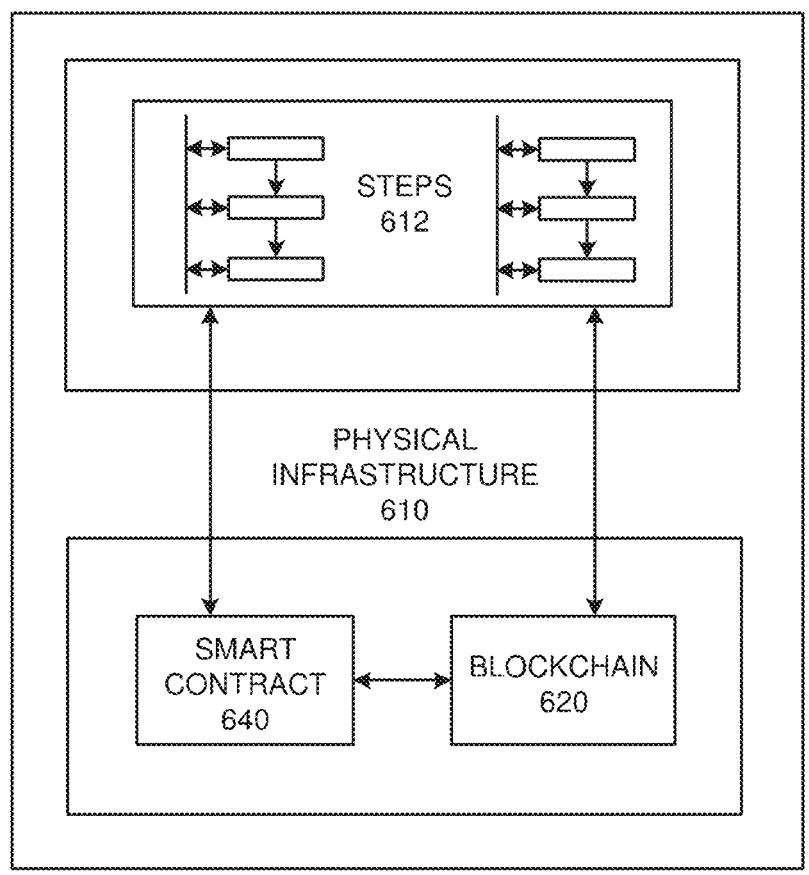
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
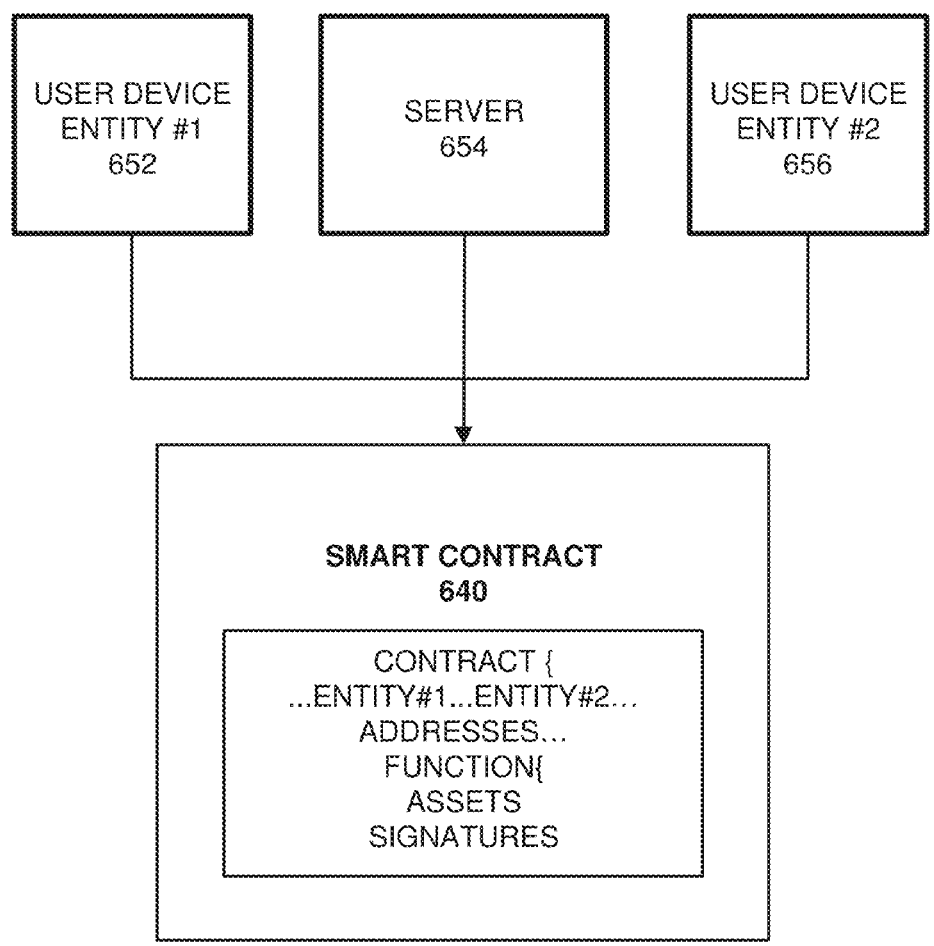
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
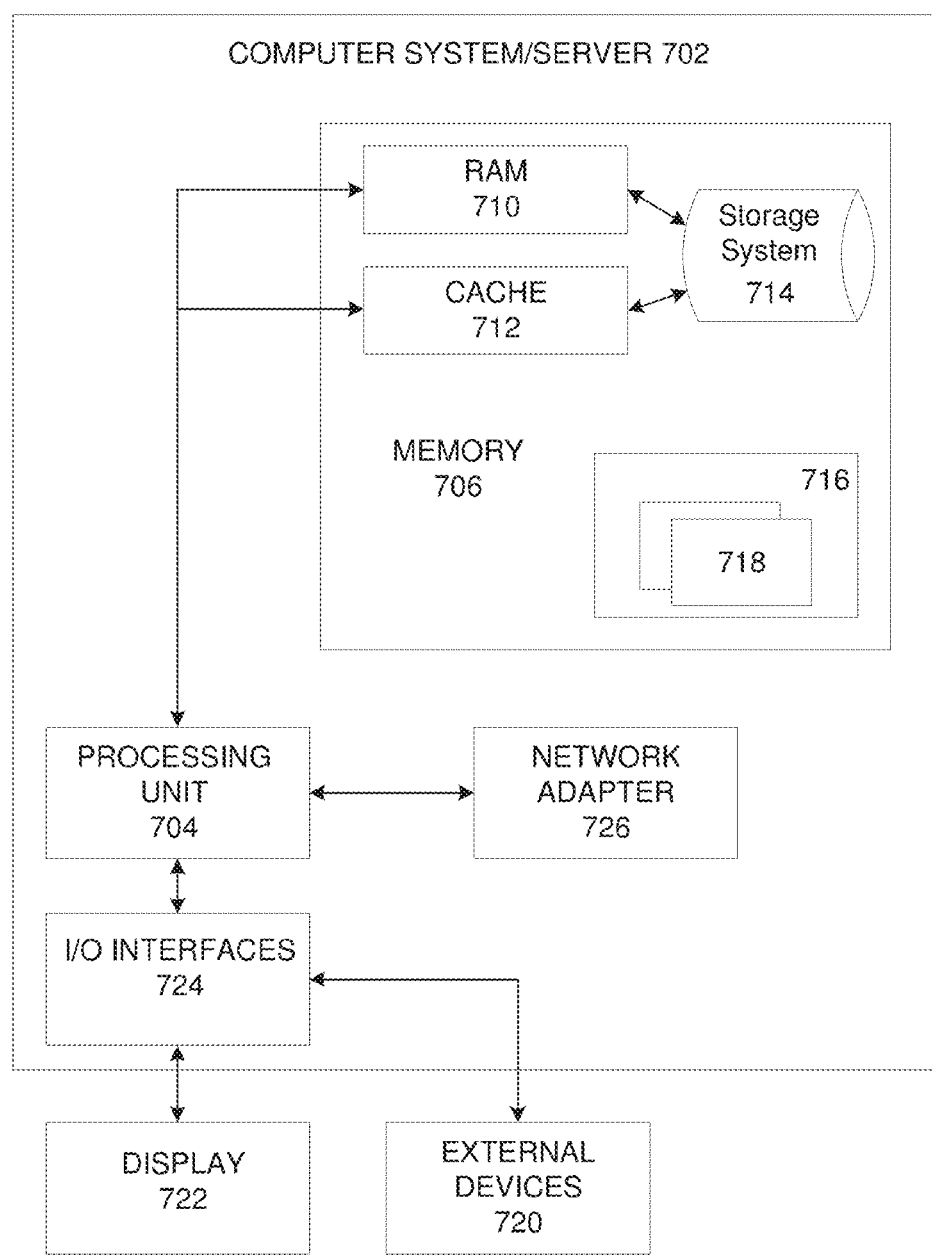
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein. For example, one or more program modules 718 may implement the ledger validation thread described herein for validating and self-correcting a distributed ledger upon detecting corrupted data.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the memory 706 may store a local copy of a distributed ledger that is stored and replicated across a plurality of nodes in a blockchain network such as blockchain peers. Meanwhile, the processor 704 may be configured to identify, via a ledger validation thread, a corrupted data block that is stored within a chain of blocks on the distributed ledger, select a blockchain peer from among a plurality of blockchain peers that have access to the distributed ledger, retrieve a replacement data block from the selected peer, determine whether the replacement data block is valid based on one or more of a previously stored validation block associated with the chain of blocks, and in response to the determination that the replacement data block is valid, replace the corrupted data block with the replacement data block on the distributed ledger. For example, the processor 704 may execute the ledger validation thread which controls the processor, operating system, hardware (network interface 726, etc.) to carry out the corrupt data detection and replacement processes.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
   a memory storing a distributed ledger; and
   a processor configured to
      identify, via a ledger validation thread, a corrupted data block that is stored within a chain of blocks on the distributed ledger,
      select a blockchain peer from among a plurality of blockchain peers that have access to the distributed ledger,
      retrieve a replacement data block from the selected peer,
      determine whether the replacement data block is valid based on a hash value stored within a following data block, with respect to the corrupted data block, within the chain of blocks, and
      in response to the determination that the replacement data block is valid, replace the corrupted data block with the replacement data block on the distributed ledger.

2. The computing system of claim 1, wherein the ledger validation thread comprises a program that runs in the memory and that has compiled code which is stored separately from files that make up the distributed ledger.

3. The computing system of claim 1, wherein the processor is further configured to retrieve a replacement data block for a following data block in the chain of blocks when it is determined that the corrupted data block has changed a block size of its original data block.

4. The computing system of claim 1, wherein the previously stored validation block comprises a correct block stored in a backup copy of the distributed ledger of a blockchain node that executes the ledger validation thread.

5. The computing system of claim 1, wherein the processor is configured to sequentially scan data blocks of the distributed ledger and validate the sequentially scanned data blocks based on respective hash values of the sequentially scanned data blocks generated at runtime to identify the corrupted data block.

6. The computing system of claim 1, wherein the processor is configured to perform a bit-by-bit comparison of the distributed ledger with a backup copy of the distributed ledger to identify the corrupted data block based on the bit-by-bit comparison.

7. The computing system of claim 1, wherein the processor is configured to pre-fetch data blocks from the distributed ledger based on a block access pattern associated with a data block currently selected from the distributed ledger, and validate the pre-fetched data blocks based on respective hashes of the pre-fetched data blocks to identify the corrupted data block from the pre-fetched data blocks.

8. The computing system of claim 1, wherein the processor is configured to sequentially validate data blocks of the distributed ledger based on previously generated checksum values of the respective data blocks to identify the corrupted data block based on the checksum values.

9. The computing system of claim 1, wherein the processor is configured to randomly select data blocks from the distributed ledger and validate the randomly selected data blocks based on respective hashes of the randomly selected data blocks to identify the corrupted data block from the randomly selected data blocks.

10. A method comprising:
    identifying, via a ledger validation thread, a corrupted data block that is stored within a chain of blocks on a distributed ledger;
    selecting a blockchain peer from among a plurality of blockchain peers that have access to the distributed ledger, and retrieving a replacement data block from the selected peer;
    determining whether the replacement data block is valid based on a hash value stored within a following data block, with respect to the corrupted data block, within the chain of blocks; and
    in response to determining the replacement data block is valid, replacing the corrupted data block with the replacement data block on the distributed ledger.

11. The method of claim 10, wherein the ledger validation thread comprises a program running in memory having compiled code which is stored separately from files that make up the distributed ledger.

12. The method of claim 10, wherein the retrieving further comprises retrieving a replacement data block for a following data block in the chain of blocks when it is determined that the corrupted data block has changed a block size of its original data block.

13. The method of claim 10, wherein the previously stored validation block comprises a correct block stored in a backup copy of the distributed ledger of a blockchain node executing the ledger validation thread.

14. The method of claim 10, wherein the identifying the corrupted data block, via the ledger validation thread, comprises sequentially scanning data blocks of the distributed ledger and validating the sequentially scanned data blocks based on respective hash values of the sequentially scanned data blocks generated at runtime to identify the corrupted data block.

15. The method of claim 10, wherein the identifying the corrupted data block, via the ledger validation thread, comprises performing a bit-by-bit comparison of the distributed ledger with a backup copy of the distributed ledger to identify the corrupted data block based on the bit-by-bit comparison.

16. The method of claim 10, wherein the identifying the corrupted data block, via the ledger validation thread, comprises pre-fetching data blocks from the distributed ledger based on a block access pattern associated with a data block currently selected from the distributed ledger, and validating the pre-fetched data blocks based on respective hashes of the pre-fetched data blocks to identify the corrupted data block from the pre-fetched data blocks.

17. The method of claim 10, wherein the identifying the corrupted data block, via the ledger validation thread, comprises sequentially validating data blocks of the distributed ledger based on previously generated checksum values of the respective data blocks to identify the corrupted data block based on the checksum values.

18. The method of claim 10, wherein the identifying the corrupted data block, via the ledger validation thread, comprises randomly selecting data blocks from the distributed ledger and validating the randomly selected data blocks based on respective hashes of the randomly selected data blocks to identify the corrupted data block from the randomly selected data blocks.

19. A non-transitory computer readable medium comprising instructions, that when read by a processor, cause the processor to perform a method comprising:
  identifying, via a ledger validation thread, a corrupted data block that is stored within a chain of blocks on a distributed ledger;
  selecting a blockchain peer from among a plurality of blockchain peers that have access to the distributed ledger, and retrieving a replacement data block from the selected peer;
  determining whether the replacement data block is valid based on a hash value stored within a following data block, with respect to the corrupted data block, within the chain of blocks; and
  in response to determining the replacement data block is valid, replacing the corrupted data block with the replacement data block on the distributed ledger.

20. The non-transitory computer readable medium of claim 19, wherein the ledger validation thread comprises a program running in memory having compiled code which is stored separately from files that make up the distributed ledger.

* * * * *